United States Patent

[11] 3,620,303

| [72] | Inventor | William G. Halbert, Jr. |
|---|---|---|
| | | Butte, Mont. |
| [21] | Appl. No. | 3,225 |
| [22] | Filed | Jan. 15, 1970 |
| [45] | Patented | Nov. 16, 1971 |
| [73] | Assignee | Tenneco Oil Company |
| | | Houston, Tex. |

[54] TAR RECOVERY METHOD
5 Claims, No Drawings

[52] U.S. Cl........................................................ 166/272,
166/274, 166/275, 252/8.55 D
[51] Int. Cl........................................................ E21b 43/22,
E21b 43/24
[50] Field of Search.............................................. 166/268,
271–275, 305 R; 252/8.55 D, 311.5; 106/277

[56]                 References Cited
               UNITED STATES PATENTS

| 2,288,857 | 7/1942 | Subkow........................ | 166/272 X |
| 2,712,506 | 7/1955 | Farris........................... | 252/311.5 X |
| 2,862,831 | 12/1958 | Mertens...................... | 106/277 |
| 3,357,487 | 12/1967 | Gilchrist et al. ............. | 166/272 X |
| 3,480,083 | 11/1969 | Oleen........................... | 166/275 |
| 2,356,205 | 8/1944 | Blair et al. .................... | 166/305 R UX |
| 3,163,214 | 12/1964 | Csaszar........................ | 166/274 |
| 3,330,344 | 7/1967 | Reisberg....................... | 166/273 X |

OTHER REFERENCES

Mayhew, R. L., et al. Phosphate Surfactants–Properties and Uses. In Soap & Chem. Spec. Apr., 1962, pp. 55– 58, 93, 95; May 1962, pp. 80, 81, 167, 169. (Copy in 252– 0 P. D. Digest)

McCutcheon' s Detergents and Emulsifiers, 1968 Annual Morristown, N.J., McCutcheon Inc. p. 132 (Copy in Group 165)

*Primary Examiner*—Ian A. Calvert
*Attorneys*—Eugene S. Coddou and Lee R. Larkin ABSTRACT: A method for recovering tar or extremely viscous hydrocarbons from an underground formation. The method includes the steps of injecting an aqueous solution of anionic orthophosphate ester surfactant into the hydrocarbon-bearing formation, retaining the surfactant in the formation at least about 24 hours, and displacing the solubilized hydrocarbon toward a recovery well. The surfactant solution forms a soluble oil microemulsion with the formation hydrocarbons.

TAR RECOVERY METHOD

BACKGROUND OF THE INVENTION

This invention relates generally to recovery of tar and viscous hydrocarbons from underground formations. More particularly, the invention relates to a method for mobilizing and bringing to the surface of the earth viscous hydrocarbon deposits which are difficult to produce by conventional production techniques.

DESCRIPTION OF THE PRIOR ART

Tar and extremely heavy crude oils in naturally occurring tar sands are too viscous to be removed by conventional oil recovery processes. Once on the surface, the tar is too viscous to be pumped in pipelines without heating. Tar from deposits exposed at the earth's surface is recovered by mining and flotation; but when the deposits are underground and not accessible directly from the surface, recovery is extremely difficult and expensive.

Underground recovery processes in the prior art have been thermal in nature. Steam injection and underground combustion are examples of techniques taught in the prior art. These two processes have been used singly or in conjunction with each other. Regardless of which of these processes is used, the tar, being a semisolid rather than a liquid, is difficult to transport. The heavy tar has a low market value and successful recovery methods for underground deposits to date have proved uneconomic to initiate and operate.

Recovery of low-viscosity hydrocarbons from underground formations has been accomplished in the prior art by the use of surfactants to form micellular dispersions. These microemulsions can be stabilized under a fairly harrow range of concentrations and used to provide good driving power to displace fluid hydrocarbons of fairly low viscosity. However, thus far in the art, the creation of such microemulsions has not been successful with surfactant solutions and extremely high-viscosity deposits, such as those found in Athabasca tar sand in Alberta, Canada.

One mechanism by which surfactant floods operate is the surface-tension-reducing effect such solutions display in more easily penetrating formations which contain low-viscosity oil. This attribute, however, would not be beneficial in attempting to produce tar or heavy hydrocarbons because the tar would be packed tightly in the formation and would not allow the drive fluid to penetrate at all.

Surfactant solutions have been used primarily for secondary recovery methods through low-viscosity fields. The present invention deals principally with a primary recovery method. The stripping and solubilizing action of the orthophosphate surfactant is utilized to dissolve the viscous hydrocarbon from its formation and form a soluble oil microemulsion therewith.

SUMMARY OF THE INVENTION

It is therefore an object of this invention to provide an inexpensive and improved method for recovering tar from underground formations through a well. Briefly stated, this invention is a method for recovering tar from an underground formation penetrated by at least two wellbores. The term "tar," insofar as this invention is concerned, includes all extremely viscous naturally occurring hydrocarbons having very low mobility. The method includes injecting into a first of the wellbores in the formation a slug of aqueous organic phosphate surfactant solution whereby the tar is converted by the solution into a soluble oil dispersion in water. It also includes the step of retaining the aqueous surfactant slug within the formation for a period of at least about 24 hours and then displacing the dispersion toward a second wellbore penetrating the formation by fluid drive means and producing the dispersion to the surface. The surfactant solution may remain in the formation for several days or weeks, or as long as necessary to properly solubilize the tar.

In the preferred embodiment, the aqueous surfactant solution includes an anionic mono-orthophosphate ester surfactant which is a free acid of an organic phosphate ester, dissolved in water in a concentration up to about 10 percent by volume. The size of the slug of aqueous surfactant solution is preferably about 2 to 25 percent of the pore volume of the formation.

The method may also include with the injection step the further step of steam-soaking or steam injection during injection and retention of the surfactant in the formation. Certain embodiments of the method may include the addition of sodium hydroxide to the surfactant solution to elevate the pH of the solution to a value greater than about 7.0.

DESCRIPTION OF THE PREFERRED EMBODIMENT

The presently preferred embodiment of the invention for recovering tar or extremely viscous hydrocarbons from an underground formation includes the step of injecting slug of aqueous surfactant solution into the formation to solubilize the hydrocarbons therein. The aqueous surfactant of the preferred embodiment includes an anionic mono-orthophosphate ester surfactant dissolved in water in a concentration up to about 10 percent by volume. Some examples of the class of organic phosphate surfactants used are AA 270 and AA 420, both free acids of an organic phosphate ester and produced by Wyandotte Chemicals Corporation, Wyandotte, Michigan.

The surfactant is retained within the formation for a period of not less than about 24 hours. The retention time allows the aqueous surfactant solution to properly form a soluble oil microemulsion with the heavy hydrocarbons and the solution may be retained whatever length of time necessary to accomplish solubilization of the material, in some cases, as long as several weeks.

After the proper retention period, the solubilized hydrocarbon is displaced toward a recovery well by conventional fluid drive methods. The dispersion of soluble oil has low viscosity and can be easily displaced toward the recovery well.

One of the advantages of this method over the prior art is the ease of formation of the soluble oil dispersion through the use of the mono-orthophosphate ester surfactant. Many surfactants have been tried in attempts to dissolve the heavy tars, but none have met with the success of the surfactant of the present invention.

Another advantage is the low cost involved in the use of such a surfactant solution to solubilize the heavy hydrocarbons. The cost of an aqueous solution of such a surfactant is much less expensive than a solvent recovery process, a steam injection process or underground combustion techniques. The surfactant can be separated from the dispersed hydrocarbon after production to the surface and can be returned and reused in the formation to solubilize more tar. The reuse of the surfactant, the lower original cost as compared to solvents, and the less expensive equipment involved in a surfactant recovery system all contribute to the lower overall cost of the surfactant recovery technique.

The formation of soluble oil microemulsions by contacting the tar deposits with the phosphate ester surfactants was an unexpected result of an attempt to form a two-phase hydrocarbon-in-water macroemulsion. The Athabasca tars are difficult to dissolve even with aromatic solvents. The formation of a fine micellular distribution of this tar in an aqueous continuous phase represents a significant advancement in production methods.

The foregoing description is to be construed as illustrative only, and alternate embodiments will be apparent to those skilled in the art in view of this description.

What is claimed is:

1. In a method for recovering tar from an underground formation penetrated by at least two wellbores, the combination of steps comprising:

injecting into a first of said wellbores in said formation a slug of aqueous surfactant, said surfactant being a free acid of an organic phosphate ester, whereby said tar is converted by said surfactant into a soluble oil dispersion in water;

retaining said aqueous surfactant slug within said formation for a period of not less than about 24 hours;

displacing said dispersion toward a second wellbore penetrating said formation by fluid drive means;

and, producing said dispersion.

2. The invention as claimed in claim 1 wherein: the size of said slug of aqueous surfactant is about 2 to about 25 percent of the pore volume of the formation.

3. The invention as claimed in claim 1 wherein: said injection step includes the further step of steam-soaking during said injection and retention of said surfactant into said formation.

4. The invention as claimed in claim 1 wherein: said surfactant solution includes sufficient sodium hydroxide to elevate the pH of said solution to a value greater than about 7.0.

5. The invention as claimed in claim 1 wherein: said surfactant solution includes a concentration of said surfactant in water of greater than about 3 to about 10 percent by volume.

* * * * *